United States Patent
Schroedle et al.

(10) Patent No.: US 9,774,057 B2
(45) Date of Patent: *Sep. 26, 2017

(54) MIXTURES AND USE THEREOF IN LITHIUM ION BATTERIES

(71) Applicants: Simon Schroedle, Ludwigshafen (DE); Jordan Keith Lampert, Ludwigshafen (DE); Martin Schulz-Dobrick, Mannheim (DE); Itamar Michael Malkowsky, Speyer (DE); Arnd Garsuch, Ludwigshafen (DE); Klaus Leitner, Ludwigshafen (DE); Olaf Kutzki, Mannheim (DE)

(72) Inventors: Simon Schroedle, Ludwigshafen (DE); Jordan Keith Lampert, Ludwigshafen (DE); Martin Schulz-Dobrick, Mannheim (DE); Itamar Michael Malkowsky, Speyer (DE); Arnd Garsuch, Ludwigshafen (DE); Klaus Leitner, Ludwigshafen (DE); Olaf Kutzki, Mannheim (DE)

(73) Assignee: BASF SE, Ludwigshafen (DE)

( * ) Notice: Subject to any disclaimer, the term of this patent is extended or adjusted under 35 U.S.C. 154(b) by 606 days.

This patent is subject to a terminal disclaimer.

(21) Appl. No.: 13/705,709

(22) Filed: Dec. 5, 2012

(65) Prior Publication Data

US 2013/0164634 A1 Jun. 27, 2013

Related U.S. Application Data

(60) Provisional application No. 61/568,178, filed on Dec. 8, 2011.

(51) Int. Cl.
| | | |
|---|---|---|
| *H01M 10/056* | (2010.01) | |
| *H01M 10/0525* | (2010.01) | |
| *H01M 10/0567* | (2010.01) | |
| *H01M 10/0569* | (2010.01) | |
| *H01M 10/625* | (2014.01) | |

(52) U.S. Cl.
CPC ..... *H01M 10/056* (2013.01); *H01M 10/0525* (2013.01); *H01M 10/0567* (2013.01); *H01M 10/0569* (2013.01); *H01M 10/625* (2015.04); *Y02E 60/122* (2013.01)

(58) Field of Classification Search
CPC ........... H02M 10/502; H02M 10/5022; H02M 10/5016
See application file for complete search history.

(56) References Cited

U.S. PATENT DOCUMENTS

| 5,118,777 | A  | * | 6/1992  | Okawa ............................ 528/34 |
| 6,235,431 | B1 |   | 5/2001  | Takechi et al. |
| 2007/0160906 | A1 | * | 7/2007 | Tooyama et al. ............. 429/223 |
| 2008/0118836 | A1 | * | 5/2008 | Hwang et al. ................ 429/219 |
| 2011/0244382 | A1 | * | 10/2011 | Christopher et al. ......... 430/105 |

FOREIGN PATENT DOCUMENTS

WO    WO 2007/049888 A1    5/2007

OTHER PUBLICATIONS

International Search Report issued Apr. 26, 2013 in PCT/EP2012/073988 with English translation of categories of cited documents.
Sheng Shui Zhang, et al., "A review on electrolyte additives for lithium-ion batteries" Journal of Power Sources 162, Elsevier, XP027938606A, Nov. 22, 2006, pp. 1379-1394.
Doron Aurbach, et al., "Studies of cycling behavior, ageing, and interfacial reactions of $LiNi_{0.5}Mn_{1.5}O_4$ and carbon electrodes for lithium-ion 5-V cells", Journal of Power Sources162, Elsevier, XP027938520A, Nov. 22, 2006, pp. 780-789.
U.S. Appl. No. 13/705,748, filed Dec. 5, 2012, Schroedle, et al.
U.S. Appl. No. 13/705/709, filed Dec. 5, 2012, Schroedle, et al.

* cited by examiner

*Primary Examiner* — Jeremiah Smith
(74) *Attorney, Agent, or Firm* — Oblon, McClelland, Maier & Neustadt, L.L.P.

(57) ABSTRACT

A mixture useful as an electrolyte in lithium ion batteries and use thereof are provided. Lithium ion batteries with good performance, especially good cyclability after prolonged operation are obtained. The mixture contains an aprotic organic solvent, a cyclic compound containing $C_1$-$C_{10}$-alkyl, $C_1$-$C_{10}$-alkoxy, $C_3$-$C_{10}$-cycloalkyl, benzyl or $C_6$-$C_{14}$-aryl, water, optionally an additive and a lithium salt.

12 Claims, 2 Drawing Sheets

Figure 1: schematic construction of a disassembled electrochemical cell for testing inventive mixtures

FIG. 2

MIXTURES AND USE THEREOF IN LITHIUM ION BATTERIES

The present invention relates to mixtures comprising
(A) at least one aprotic organic solvent or a mixture of aprotic solvents which is liquid at room temperature,
(B) at least one compound of the general formula (I) or (II), (I)

(II)

where
$R^1$ in each occurrence is the same or different and selected from $C_1$-$C_{10}$-alkyl, $C_1$-$C_{10}$-alkoxy, $C_3$-$C_{10}$-cycloalkyl, benzyl and $C_6$-$C_{14}$-aryl, each unsubstituted or substituted one or more times with $C_1$-$C_4$-alkyl, benzyl or phenyl,
$R^2$ is selected from $COOR^7$, $C_1$-$C_{10}$-alkyl, $C_2$-$C_{10}$-alkenyl, $C_3$-$C_{10}$-cycloalkyl, benzyl, $C_6$-$C_{14}$-aryl, each unsubstituted or substituted one or more times with $C_1$-$C_4$-alkyl, benzyl or phenyl,
$R^3$ and $R^4$ are the same or different and are each selected from hydrogen, $C_1$-$C_{10}$-alkyl, $C_3$-$C_{10}$-cycloalkyl, benzyl and $C_6$-$C_{14}$-aryl, each unsubstituted or substituted one or more times with $C_1$-$C_4$-alkyl, benzyl or phenyl,
or $>C(R^3)_2$ is a $>C=O$ group,
X, if present at all or in multiple occurrence, is the same or different and selected from oxygen, sulfur, N—$R^5$ and $C(R^6)_2$, where
$R^5$ is selected from $C_1$-$C_{10}$-alkyl, $C_3$-$C_{10}$-cycloalkyl and $C_6$-$C_{14}$-aryl, each unsubstituted or substituted one or more times with $C_1$-$C_4$-alkyl, benzyl or phenyl,
$R^6$ in each occurrence is the same or different and selected from hydrogen, $C_1$-$C_{10}$-alkyl, $C_3$-$C_{10}$-cycloalkyl, benzyl and $C_6$-$C_{14}$-aryl, each unsubstituted or substituted one or more times with $C_1$-$C_4$-alkyl, benzyl or phenyl,
$R^7$ is selected from $C_1$-$C_4$-alkyl,
n is an integer from 1 to 3,
(C) from zero to 30 ppm of water,
(D) optionally at least one further additive,
(E) optionally at least one lithium salt.

The search for ways to store electric energy efficiently has been going on for years. Efficient storage of electric energy would allow electric energy to be generated when it is advantageous and used when needed.

Accumulators, for example lead accumulators and nickel-cadmium accumulators, have been known for many decades. The known lead accumulators and nickel-cadmium accumulators have the disadvantages of a comparatively low energy density and of a memory effect which reduces the rechargeability and hence the useful life of lead accumulators and nickel-cadmium accumulators.

Lithium ion accumulators, frequently also referred to as lithium ion batteries, are used as an alternative. They provide higher energy densities than accumulators based on lead or comparatively noble heavy metals.

Since metallic lithium, i.e., lithium in oxidation state 0, is used, or formed as an intermediate, in lithium ion batteries, they are water sensitive. Furthermore, the electrolytes used, for example $LiPf_6$, are water sensitive during long-term operation. Water is therefore out of the question as a solvent for the lithium salts used in lithium ion batteries. Instead, organic carbonates, ethers and esters are used as sufficiently polar solvents. The literature accordingly recommends using water-free solvents for the electrolytes, see for example WO 2007/049888.

Water-free solvents, however, are inconvenient to produce and process. Numerous solvents inherently useful for lithium ion batteries comprise in the order of 100 ppm or more of water. However, such high proportions of water are unacceptable for most lithium ion batteries. The problem of providing sufficiently suitable solvents for lithium ion batteries is complicated by the fact that most state of the art lithium ion batteries comprise not a single solvent but solvent mixtures of which some differ greatly in their activity with driers.

U.S. Pat. No. 6,235,431 proposes adding compounds having Si—N bonds as an additive to the solvent (mix) in a lithium ion battery. This compound reacts with water and thereby protects not only the conducting salt but also the cathode material. U.S. Pat. No. 6,235,431 specifically recommends organosilazanes and organodisilazanes as well as hexamethylcyclotrisilazane. It was observed, however, that compounds of this type can react with water to form ammonia or volatile organic amines which are capable of damaging a lithium ion battery in prolonged operation thereof.

The present invention has for its object to provide media useful as electrolytes in lithium ion batteries. The present invention further has for its object to provide a process for producing media useful for lithium ion batteries. The present invention finally has for its object to provide lithium ion batteries having good performance characteristics.

We have found that this object is achieved by the mixtures defined at the beginning.

For the purposes of the present invention, lithium ion accumulators are also referred to as lithium ion batteries.

Mixtures according to the present invention are liquid under standard conditions (1 bar, 0° C.) and preferably also at 1 bar and −15° C.

Mixtures according to the present invention comprise at least one aprotic organic solvent (A), preferably at least two aprotic organic solvents (A) and more preferably at least three aprotic organic solvents (A).

In one embodiment of the present invention, mixtures according to the present invention may comprise up to ten different aprotic organic solvents (A).

For the purposes of the present invention, aprotic organic solvents are not just those aprotic organic solvents (A) that are liquid at room temperature.

The present invention also comprises aprotic organic compounds which are solid at room temperature as pure compound, but which are liquid in admixture with the remaining aprotic organic solvents (A). Ethylene carbonate may be mentioned by way of example in that it is liquid within wide limits when in a mixture with diethyl carbonate and/or methyl ethyl carbonate, but as a pure substance has a melting point of about 36° C.

In one embodiment of the present invention aprotic solvents (A) are selected from
(a) cyclic and noncyclic organic carbonates,
(b) di-$C_1$-$C_{10}$-alkyl ethers,
(c) di-$C_1$-$C_4$-alkyl-$C_2$-$C_6$-alkylene ethers,
(d) cyclic ethers,
(e) cyclic and acyclic acetals and ketals,
(f) orthocarboxylic esters, and
(g) cyclic and noncyclic carboxylic esters.

Preference is given to cyclic and noncyclic organic carbonates (a), di-$C_1$-$C_{10}$-alkyl ethers (b), di-$C_1$-$C_4$-alkyl-$C_2$-$C_6$-alkylene ethers (c) and cyclic and acyclic acetals and ketals (e).

Examples of preferred noncyclic organic carbonates (a) are di-$C_1$-$C_4$-alkyl carbonates where $C_1$-$C_4$-alkyl may be the same or different and is selected from $C_1$-$C_4$-alkyl, for example methyl, ethyl, n-propyl, isopropyl, n-butyl, isobutyl, sec-butyl, preferably methyl or ethyl.

Particularly preferred noncyclic organic carbonates (a) are dimethyl carbonate, diethyl carbonate and methyl ethyl carbonate and mixtures thereof, i.e. mixtures of at least two of the recited compounds dimethyl carbonate, diethyl carbonate and methyl ethyl carbonate.

Examples of preferred cyclic organic carbonates (a) are those of the general formula (III a) and (III b)

(III a)

(III b)

where $R^8$ is selected from $C_1$-$C_4$-alkyl, for example methyl, ethyl, n-propyl, isopropyl, n-butyl, isobutyl, sec-butyl, preferably methyl, fluorine, mono- or polyfluorinated $C_1$-$C_4$-alkyl, for example $CF_3$ or n-$C_4H_9$, and especially hydrogen.

Preferred cyclic organic carbonate (a) is further difluoroethylene carbonate,

Examples of preferred di-$C_1$-$C_{10}$-alkyl ethers (b) are diethyl ether, diisopropyl ether and di-n-butyl ether.

Examples of di-$C_1$-$C_4$-alkyl-$C_2$-$C_6$-alkylene ethers (c) are 1,2-dimethoxyethane 1,2-diethoxyethane, diethylene glycol dimethyl ether, triethylene glycol dimethyl ether, tetraethylene glycol dimethyl ether and diethylene glycol diethyl ether.

Examples of cyclic ethers (d) are 1,4-dioxane and tetrahydrofuran (THF).

Examples of acyclic acetals and ketals (e) are 1,1-dimethoxyethane and 1,1-diethoxyethane.

Examples of cyclic acetals and ketals (e) are 1,3-dioxolane and 1,3-dioxane.

Examples of orthocarboxylic esters (f) are tri-$C_1$-$C_4$-alkyl orthoformates, especially trimethyl Orthoformate and triethyl orthoformate.

Examples of carboxylic esters (g) are ethyl acetate and methyl butyrate and also dicarboxylic esters, for example dimethyl malonate. γ-Butyrolactone is an example of a cyclic carboxylic ester (lactone).

In one specific embodiment of the present invention, mixture according to the present invention comprises noncyclic organic carbonate(s) and cyclic organic carbonate(s) in a weight ratio of 1:10 to 10:1 and preferably 3:1 to 1:1.

Mixture according to the present invention further comprises
(B) at least one compound of general formula (I) or (II), (I)

(II)

also known as compound (B) for short,
where the variables are defined as follows:
$R^1$ in each occurrence is different or preferably the same and selected from
  $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl,
  $C_1$-$C_{10}$-alkoxy, preferably $C_1$-$C_4$-n-alkoxy, for example ethoxy, n-propoxy, n-butoxy and especially methoxy,
  $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl,
  benzyl and
  $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl,
  each unsubstituted or substituted one or more times with $C_1$-$C_4$-alkyl, especially methyl or isopropyl, or with benzyl or phenyl, examples of substituted pheny being for example para-methylphenyl, 2,6-dimethylphenyl and para-biphenyl.

$R^2$ is selected from $COOR^7$, for example $COOCH_3$, $COOC_2H_5$, $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl, ethyl or isopropyl, $C_2$-$C_{10}$-alkenyl, especially vinyl, 1-allyl, 2-allyl and homoallyl, $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl, benzyl, $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl, each unsubstituted or substituted one or more times with $C_1$-$C_4$-alkyl, especially methyl or isopropyl, or with benzyl or phenyl, $R^3$ and $R^4$ are each different or preferably the same and selected from $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl, $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl, benzyl, $C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl and more preferably phenyl, each unsubstituted or substituted one or more times with $C_1$-$C_4$-alkyl, especially methyl or isopropyl, or with benzyl or phenyl, and especially hydrogen, or $>C(R^3)_2$ is a $>C=O$ group.

Examples of preferred $>C(R^3)_2$ are further $CHC_6H_5$, $CH(CH_3)$, $C(CH_3)_2$ and especially $CH_2$.

Preferably, $R^3$ and $R^4$ are each pairwise the same and selected from hydrogen and methyl.

X in each occurrence is different or the same and selected from oxygen, sulfur, N—$R^5$ and $C(R^6)_2$, where $R^5$ is selected from $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-nonyl, n-decyl; more preferably $C_1$-$C_4$-alkyl such as methyl, ethyl, n-propyl, isopropyl, n-butyl, isobutyl, sec-butyl and tert-butyl and even more preferably methyl, $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl, benzyl and $C_6$-$C_{14}$-aryl, each unsubstituted or substituted one or more times with $C_1$-$C_4$-alkyl, especially methyl or isopropyl, or with benzyl or phenyl, $R^6$ in each occurrence is the same or preferably different and selected from hydrogen and $C_1$-$C_{10}$-alkyl, for example methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; more preferably $C_1$-$C_4$alkyl such as methyl, ethyl, n-propyl, isopropyl, n-butyl, isobutyl, sec-butyl and tert-butyl and even more preferably methyl, $C_3$-$C_{10}$-cycloalkyl, for example cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl, benzyl and $C_6$-$C_{14}$-aryl, each unsubstituted or substituted one or more times with $C_1$-$C_4$-alkyl, especially methyl or isopropyl, or with benzyl or phenyl, each unsubstituted or substituted one or more times with $C_1$-$C_4$-alkyl, benzyl or phenyl, $R^7$ is selected from $C_1$-$C_4$-alkyl, such as methyl, ethyl, n-propyl, isopropyl, n-butyl, isobutyl, sec-butyl and tert-butyl and very particularly preferably methyl, ethyl and Isopropyl, n is an integer from 1 to 3, preferably 1 or 2 and especially 1.

It is particularly preferable for X to be selected from $CHCH_3$ and $CH(CH_2CH_3)$.

When, in compounds of formula (II), n=1, then the formula corresponds to the general formula (II')

where n = 1 and there is no actual group X.

In one preferred embodiment of the present invention, compound (B) is selected from compounds of the general formulae (I a), (I b), (II a) and (II b), (I a)

(I b)

(II a)

(II b)

(I b.1)

(II a.1)

(II b.1)

Mixture according to the present invention further comprises (C) from zero to 30 ppm of water, preferably from 3 to 25 ppm and more preferably at least 5 ppm. Here ppm is weight ppm (parts per million), based on total mixture according to the present invention.

The proportions of water (C) can be determined by various methods known per se. Karl Fischer titration to DIN 51777 or ISO760: 1978 for example is particularly suitable. By "zero ppm of water" is meant that the water amounts are below the detection limit.

Mixture according to the present invention may further comprise at least one additive, also called additive (D) for short. Additives (D) may be for example: aromatic compounds, sultones, cyclic exo-methylene carbonates, lithium bisoxalatoborate (LiBOB) and lithium (difluoroxalato)borate (LiDFOB).

Examples of aromatic compounds suitable as additive (D) are biphenyl, cyclohexylbenzene and 1,4-dimethoxybenzene.

Sultones may be substituted or unsubstituted. Examples of suitable sultones are butanesultone and propylenesultone (propanesultone), formula (III), $R^1$ in each occurrence is different or the same and selected from $C_1$-$C_4$-alkyl, such as methyl, ethyl, n-propyl, isopropyl, n-butyl, isobutyl, sec-butyl and tert-butyl, very particularly preferably methyl, $C_1$-$C_4$-alkoxy, such as ethoxy, n-propoxy, isopropoxy, n-butoxy and especially methoxy, and phenyl,

$R^2$ is selected from $C_1$-$C_4$-alkyl, such as methyl, ethyl, n-propyl, isopropyl, n-butyl, isobutyl, sec-butyl and tert-butyl, very particularly preferably methyl and tert-butyl, $COOCH_3$, $COOC_2H_5$, $C_2$-$C_3$-alkenyl, for example —CH=CH$_2$, —CH$_2$—CH=CH$_2$, (E)-CH=CH—CH$_3$ and (Z)—CH=CH—CH$_3$, and phenyl, $R^6$ in each occurrence is the same or preferably different and selected from hydrogen and methyl.

In one preferred embodiment of the present invention, compound (B) is selected from the following compounds:

(I a.1)

(III)

and particularly sultones having at least one C—C double bond per molecule. An example of a substituted sultone is 1-phenyl-1,3-butanesultone.

Examples of exo-methylene ethylene carbonates useful as additive (D) are particularly compounds of general formula (IV)

(IV)

where in each case $R^9$ and $R^{10}$ can be different or the same and are selected from $C_1$-$C_{10}$-alkyl and hydrogen. In one preferred embodiment, $R^9$ and $R^{10}$ are both methyl. In another preferred embodiment of the present invention, $R^9$ and $R^{10}$ are both hydrogen.

Additives (D) may further be cyclic or acyclic alkanes which preferably have a boiling point of at least 36° C. as pure substances and at a pressure of 1 bar. Examples are cyclohexane, cycloheptane and cyclododecane. It is further possible to use organic esters of inorganic acids, for example methyl ester or ethyl ester of phosphoric acid or sulfuric acid.

Mixture according to the present invention may further comprise at least one lithium salt (E). Lithium salts (E) are preferably salts of monovalent anions. Examples of suitable lithium salts (E) are $LiPF_6$, $LiBF_4$, $LiClO_4$, $LiAsF_6$, $LiCF_3SO_3$, $LiC(C_xF_{2x+1}SO_2)_3$, lithium bisoxalatoborate (LIBOB), lithium difluorobisoxalatoborate (LDFOB), lithium imides such as $LiN(C_xF_{2x+1}SO_2)_2$, where x is an integer from 1 to 20, $LiN(SO_2F)_2$, $Li_2SiF_6$, $LiSbF_6$, $LiAlCl_4$, and salts of the general formula $(C_xF_{2x+1}SO_2)_mXLi$, where x is as defined above and m is as defined below:
m=1, when X is selected from oxygen and sulfur,
m=2, when X is selected from nitrogen and phosphorus, and
m=3, when X is selected from carbon and silicon.

Particularly preferred lithium salts (E) are selected from $LiPF_6$, $LiBF_4$, $LiSbF_6$, LiBOB, LDFOB and $LiPF_3(CF_2CF_3)_3$ (LiFAP).

It is preferable for mixture according to the present invention to comprise at least one lithium salt (E).

In one embodiment of the present invention, mixture according to the present invention contains no further components beyond solvent (A), compound (B), water (C), optional additive (D) and optional lithium salt (E).

In one embodiment of the present invention, mixture according to the present invention has the following composition:
(A) altogether from 50 to 99.5 wt %, preferably from 60 to 95 wt % and more preferably from 70 to 90 wt % of aprotic organic solvent or mixture of aprotic organic solvents which is liquid at room temperature,
(B) from 0.01 to 5 wt %, preferably from 0.08 to 3 wt % and more preferably from 0.15 to 2 wt % of compound of general formula (I) or (II),
(C) zero to 50 ppm, preferably 3 to 25 ppm and more preferably at least 5 ppm of water,
(D) altogether zero to altogether 10 wt %, preferably 0.01 to 5 wt % and more preferably 0.4 to 2 wt % of additive(s),
(E) zero to 25 wt % and preferably 5 to 18 wt % of lithium salt,
wherein recitations in wt % and ppm are each based on total mix.

Mixtures according to the present invention are very useful as electrolytes in lithium ion batteries. Lithium ion batteries are obtained with very good performance characteristics, for example very good cyclability after prolonged operation. The present invention accordingly further provides lithium ion batteries comprising at least one mixture according to the present invention. The present invention further provides for the use of mixtures according to the present invention in lithium ion batteries. The present invention further provides a process for producing lithium ion batteries by using at least one mixture according to the present invention.

Lithium ion batteries in this connection are batteries in which lithium ions act as charge carriers transporting the charge. Examples which may be mentioned include batteries which include at least one cathode comprising a lithium-containing transition metal mixed oxide of layered structure, a lithiated transition metal mixed oxide of spinel structure or a lithiated transition metal phosphate of olivine structure, for example $LiFePO_4$ and $LiMnPO_4$. Suitable transition metal mixed oxides of layered structure are $LiMnO_2$, $LiCoO_2$, $LiNiO_2$ and especially those of general formula $$Li_{(1+y)}[Ni_aCo_bMn_c]_{(1-y)}O_2$$

where y is selected from zero to 0.3 and preferably from 0.05 to 0.2,
a, b and c may each be the same, different or pairwise the same and are in the range from 0.1 to 0.8, subject to the proviso:

$$a+b+c=1$$

Suitable transition metal mixed oxides of spinel structure are especially those of the general formula (V)

$$Li_{1+t}M_{2-t}O_{4-d} \quad (V)$$

where d is from zero to 0.4 and
t is from zero to 0.4, and
M is selected from one or more metals of groups 3 to 12 of the periodic table, for example Ti, V, Cr, Mn, Fe, Co, Ni, Zn, Mo, with Mn, Co and Ni being preferred, and especially from combinations of Ni and Mn.

In one embodiment of the present invention, at least one cathode of a battery according to the present invention comprises a cathodic active material having a manganese content in the range from 50 to 10 wt % and preferably in the range from 50 to 80 wt %, based on transition metal content.

In one embodiment of the present invention, at least one anode of a battery according to the present invention comprises carbon in an electrically conductive form, for example carbon black, what is known as hard carbon, i.e., graphite-like carbon with larger amorphous regions than graphite has, or preferably graphite.

For mixtures according to the present invention to be used according to the present invention in lithium ion batteries it is not absolutely necessary for mixture according to the present invention and especially compound of general formula (I) or (II) to be present in the lithium ion battery throughout the entire lifetime of the lithium ion battery in question. Compound of general formula (I) can decrease in amount or be completely consumed.

One embodiment of the present invention utilizes a battery which includes mixture according to the invention which has only little, for example 0.01 to 0.3 wt % of compound of general formula (I) or (II). The latter reacts with traces of water, for example with traces of water which come from the electrode material or from individual solvents, for example to form a polymeric film or to form other nonvolatile decomposition products. Compound of general formula (I) or (II) can further react with HF traces.

Cathodes based on transition metal mixed oxide may further include for example carbon in electrically conductive form, for example as carbon black, graphite, graphene or else carbon nanotubes.

Cathodes in batteries according to the present invention may further comprise for example a binder, for example a polymeric binder. Particularly suitable polymeric binders are polyvinylidene fluoride (PVdF), polytetrafluoroethylene, copolymers of tetrafluoroethylene and hexafluoropropylene, copolymers of tetrafluoroethylene and vinylidene fluoride and polyacrylonitrile.

Lithium ion batteries according to the present invention may further comprise an anode that consists of materials known per se and preferably consist essentially of graphite. Lithium ion batteries according to the present invention may further comprise customary constituents, for example one or more separators, one or more current collector platelets and a casing.

The present invention further provides a process for producing mixtures which are in accordance with the present invention, also referred to as inventive production process for short. The inventive production process comprises the steps of ($\alpha$) providing at least one aprotic organic solvent (A), called step ($\alpha$) for short, ($\beta$) optionally mixing with at least one further aprotic organic solvent (A), also called step ($\beta$) for short, to obtain a mixture that is liquid at standard conditions, ($\gamma$) optionally mixing with one or more additives (D), called step ($\gamma$) for short, ($\delta$) drying, called step ($\delta$) for short, and ($\epsilon$) mixing with compound of general formula (I) or (II) and optionally with at least one additive (D) and optionally with at least one lithium salt (E), called step ($\epsilon$) for short.

Steps ($\alpha$) to ($\epsilon$) may be carried out in the aforementioned order or in some other order. It is possible for instance to adhere essentially to the aforementioned order of steps ($\alpha$) to ($\epsilon$), but to form step ($\delta$) immediately before step ($\gamma$).

Another version comprises adhering essentially to the aforementioned order of steps ($\alpha$) to ($\epsilon$), but to perform step ($\gamma$) directly before step ($\beta$).

Solvent (A), additives (D), compound of general formula (I) and (II) and lithium salts (E) are defined above.

Steps ($\alpha$) to ($\epsilon$) will now be more particularly described.

Mixing components (A), (B) and optionally (C) can be done at any desired temperature.

Step ($\alpha$):

One or more solvents (A) are provided. Individual solvents (A) or all solvents (A) may be provided in the dried state, for example with a water content of 1 to 50 ppm, or with a higher water content.

Steps ($\beta$), ($\gamma$) and ($\epsilon$): mixing steps

One embodiment of the present invention comprises mixing in each case at temperatures ranging from 10 to 100° C. and more preferably at room temperature.

One embodiment of the present invention comprises mixing at a temperature of at least 1° C. above the melting point of the highest-melting solvent (A).

The upper temperature limit for mixing is determined by the volatility of the most volatile solvent (A). Preference is given to mixing at a temperature below the boiling point of the most volatile solvent (A).

Mixing can be done at any desired pressure, and atmospheric pressure is preferred. The duration of mixing can be chosen for example in the range from 5 minutes up to 24 hours.

Step ($\beta$) comprises choosing the quantitative ratios of solvent(s) (A) such that a mixture that is liquid at room temperature is obtained. Preference is given to choosing the quantitative ratios of solvent(s) (A) such that a mixture that is liquid at 0° C. is obtained. Particular preference is given to choosing the quantitative ratios of the solvent(s) (A) such that a mixture that is liquid at −15° C. is obtained. Examination as to whether the mixture from step ($\beta$) is liquid can be effected for example through simple optical inspection, for example through visual inspection.

The melting point of a mixture can be lowered by adding diethyl carbonate or methyl ethyl carbonate for example.

Mixing preferably takes place under anhydrous conditions, i.e., under exclusion of air and especially under exclusion of moisture, for example under dry air. Mixing preferably takes place under air exclusion (inert conditions), for example under dry nitrogen or dry noble gas.

Step ($\delta$):

Step ($\delta$) comprises drying. Drying can take place after or preferably before addition of compound of general formula (I) or (II), optionally of additive(s) (D) and optionally of lihtium salt(s) (E).

Drying can be effected in a conventional manner over a drier, preferably over molecular sieves. Molecular sieves are preferably chosen from natural and synthetic zeolites which can be in the form of spheres (beads), powders or rods. Preference is given to using 4 Å molecular sieve and more preferably 3 Å molecular sieve.

The actual drying can be effected for example by stirring above the drier(s).

Preference is given to letting molecular sieve act on solvent (A) in the absence of chemical driers. Chemical driers for the purposes of the present invention are strongly acidic, alkaline or strongly reducing driers, more particularly selected from low molecular weight compounds, salts and elements. Known acidic driers include for example aluminum alkyls such as for example trimethylaluminum, also phosphorus pentoxide and concentrated sulfuric acid. Known basic driers include for example potassium carbonate and $CaH_2$. Known reducing driers include for example elemental sodium, elemental potassium and sodium-potassium alloy.

One embodiment of the present invention comprises conducting step ($\delta$) at a temperature in the range from 15 to 40° C. and preferably in the range from 20 to 30° C.

In one embodiment of the present invention, the time for which molecular sieve is allowed to act in step ($\delta$) is in the range from a few minutes, for example at least 5 minutes, to several days, preferably not more than 24 hours and more preferably in the range from 1 to 6 hours.

During the practice of step ($\delta$) a little solvent mixture can be removed one or more times in order that the progress of drying may be tracked by means of Karl Fischer titration.

It is preferable to keep the stirring or shaking to a minimum. Excessively vigorous stirring/shaking can lead to partial disintegration of the molecular sieve, and this may give rise to problems with removal by filtration.

This is followed by removing the drier(s), for example by distilling the solvent(s) (A) off and especially by decanting or filtration.

Practice of the process according to the invention provides a mixture which is in accordance with the present invention.

The invention is further elucidated by working examples.

Working Examples

Recitations in % are always wt %, unless expressly stated otherwise.

The electrodes used were as follows in all cases:

Cathode (Kat-1): a lithium-nickel-manganese-spinel electrode was used, it was prepared as follows. The following were mixed together:

85% of $LiMn_{1.5}Ni_{0.5}O_4$

6% of PVdF, commercially available as Kynar Flex® 2801 from Arkema Group,

6% of carbon black, BET surface area 62 $m^2/g$, commercially available as "Super P Li" from Timcal, 3% of graphite, commercially available as KS6 from Timcal;

in a screw-top vessel. Sufficient N-methylpyrrolidon (NMP) was added under agitation to obtain a viscid paste without lumps. Stirring was done for 16 hours.

The paste thus obtained was then blade coated onto aluminum foil 20 μm in thickness and dried in a vacuum drying cabinet at 120° C. for 16 hours. Coating thickness after drying was 30 μm. Circular segments were then die cut out with a diameter of 12 mm.

Anode (An-1): The following were mixed together:

91% of ConocoPhillips $C_5$ graphite

6% of PVdF, commercially available as Kynar Flex® 2801 from Arkema Group,

3% of carbon black, BET surface area 62 $m^2/g$, commercially available as "Super P Li" from Timcal, in a screw-top vessel. Sufficient NMP was added under agitation to obtain a viscid paste without lumps. Stirring was done for 16 hours.

The paste thus obtained was then blade coated onto copper foil 20 μm in thickness and dried in a vacuum drying cabinet at 120° C. for 16 hours. Coating thickness after drying was 35 μm. Circular segments were then die cut out with a diameter of 12 mm.

Figure 1:
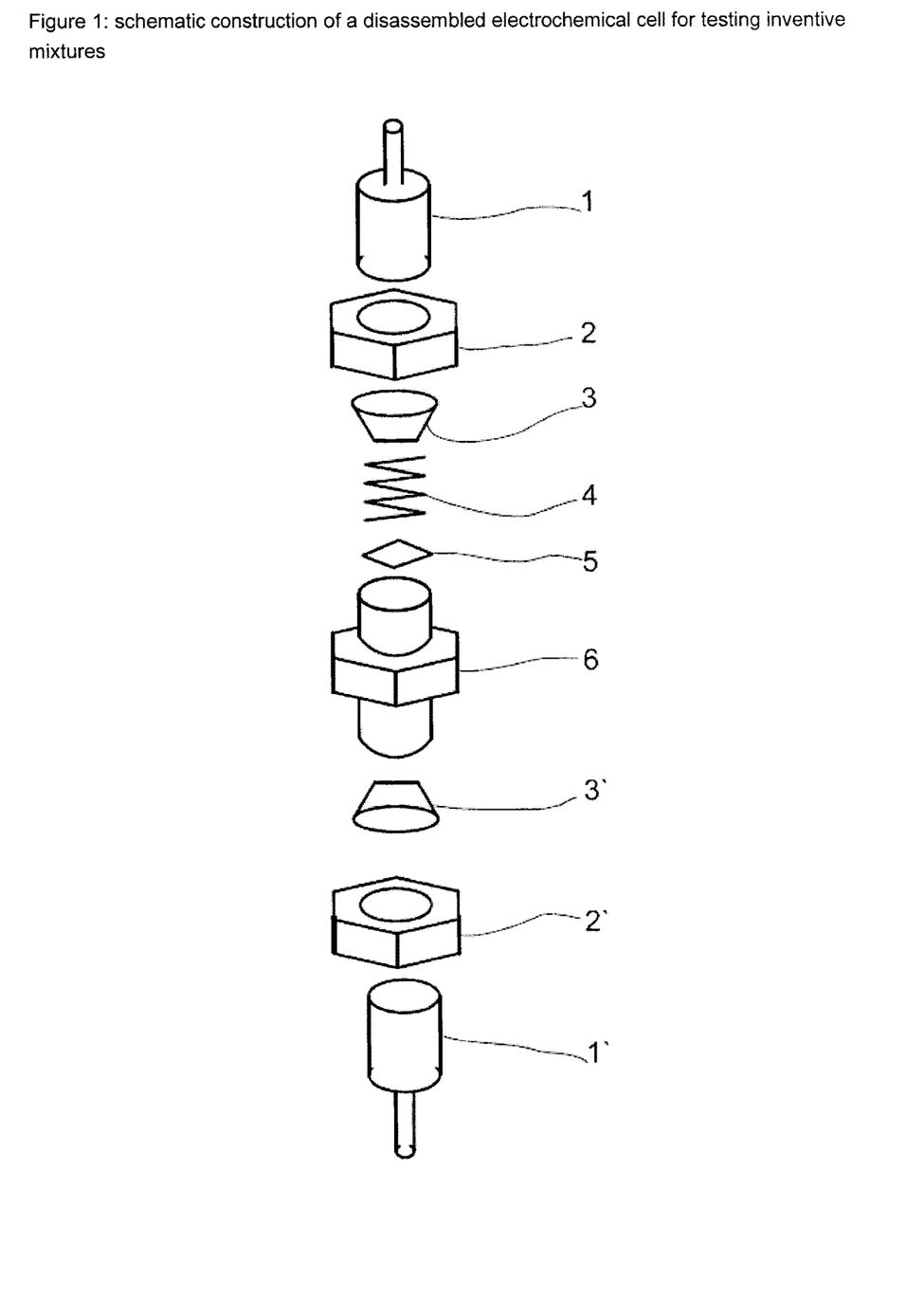
FIG. 1 displays a schematic construction of a disassembled electrochemical cell for testing inventive mixtures.

The test cell used had a construction as per FIG. 1. On assembly of the cell, it was assembled in the upward direction of the schematic FIG. 1. FIG. 1 has the anode side at the top and the cathode side at the bottom.

The annotations in FIG. 1 mean:

1, 1' die 2, 2' nut 3, 3' sealing ring—two in each case; the second, somewhat smaller sealing ring in each case is not shown here 4 spiral spring 5 current collector made of steel 6 housing

Cathode (Kat-1) was applied atop the die of cathode side 1'. A separator composed of glass fiber, thickness of separator: 0.5 mm, was then laid atop cathode (Kat-1). The mixture to be tested was drizzled onto the separator. Anode (An-1) was placed on the drenched separators. Current collector 5 took the form of stainless steep platelets applied directly to the anode. Then, the seals 3 and 3' were added and the components of the test cell were screwed together. The steel spring configured as spiral spring 4 and the pressure produced by the threaded union with anode die 1 ensured electrical contact.

II.1 Producing an Inventive Electrochemical Cell EZ.1 and Testing

Whatman (GF/D) was used as separator and drizzled for this purpose with electrolyte in an argon-filled glove box and positioned between a cathode (Kat-1) and an anode (An-1), so that both the anode and the cathode were in direct contact with the separator. Electrolyte E-1 was added to obtain inventive electrochemical cell EZ.1.

The test mixture used as E-1 ("electrolyte") was:

1 M $LiPF_6$, dissolved in ethylene carbonate and ethyl methyl carbonate in a mass ratio of 1:1, and 2 wt % of compound (I a.1), based on sum total of $LiPF_6$, ethylene carbonate and ethyl methyl carbonate.

(I a.1)

For this a mixture of ethylene carbonate and ethyl methyl carbonate (1:1, see above) was dried over molecular sieves. Then, compound (I a.1) was dissolved in the mixture. This was followed by further drying over molecular sieves and the addition of $LiPF_6$ to obtain test mixture ("electrolyte") E-1.

E-1 comprised 12 ppm of water, determined by Karl Fischer titration to DIN 51777 or ISO760: 1978 with coulometric detection.

The test was repeated but with an electrolyte solution comprising no (I a.1) to obtain electrochemical comparative cell V-EZ.2.

II. Electrochemical Characterization of Cells:

The electrochemical investigations on EZ.1 and V-EZ.2 were carried out between 4.25 V and 4.8 V.

The first two cycles were run at 0.2 C rate for forming; cycles No. 3 to No. 50 were cycled at 1 C rate, followed again by 2 cycles at 0.2 C rate, followed by 48 cycles at 1 C rate, etc. The cell was charged/discharged using an MACCOR Battery Tester at room temperature.

It was possible to show that battery capacity remained very stable throughout repeated charging and discharging.

Figure 2:
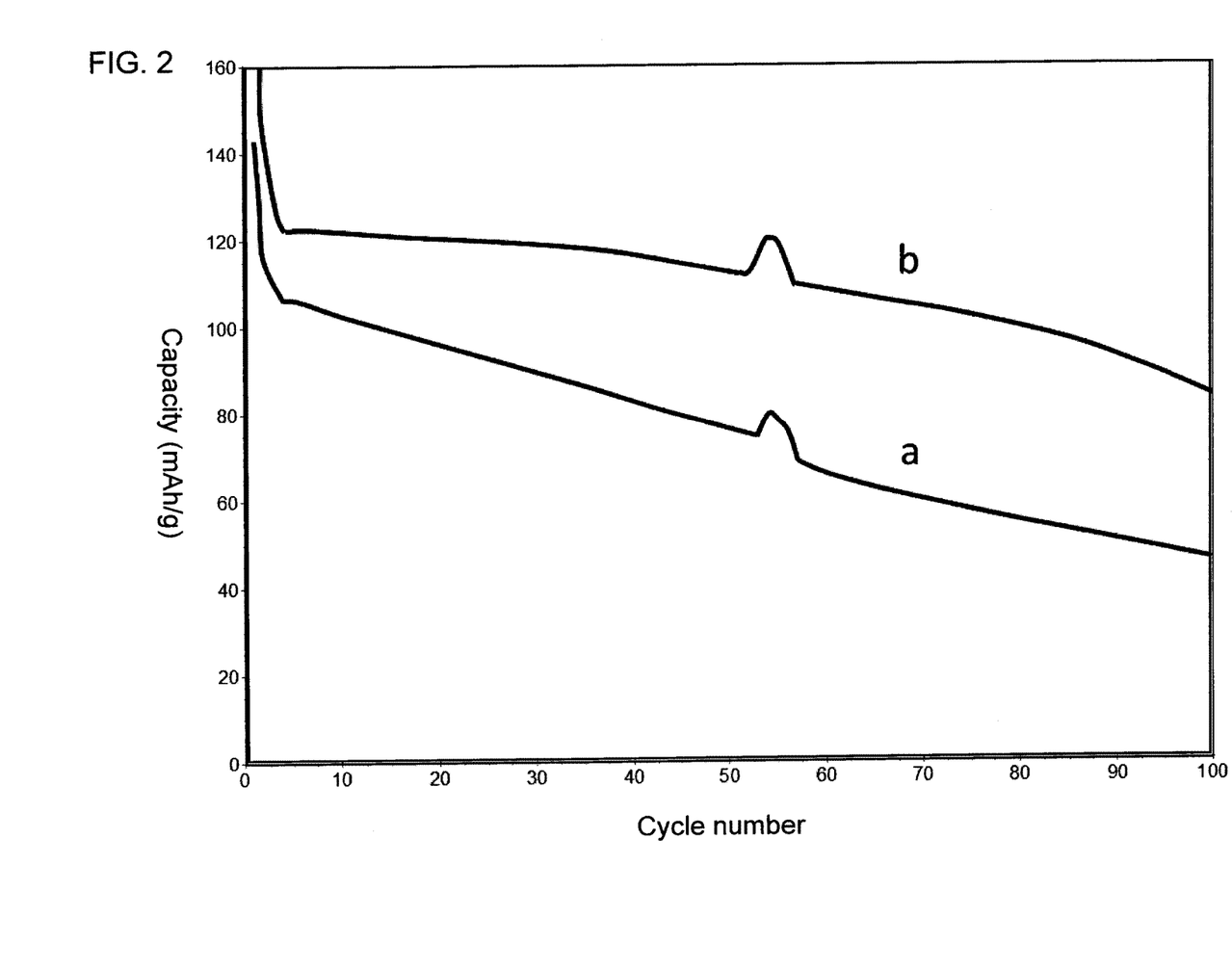
FIG. 2 displays the results of the electrochemical investigations on EZ.1 and V-EZ.2, depicted as capacity vs. cycle number for EZ.1 (curve b) and V-EZ.2 (curve a).

The results are depicted in FIG. 2.

We claim:

1. A mixture, comprising:
   an aprotic organic solvent or an aprotic organic solvent mixture;
   at least one compound selected from the group consisting of formula (I) and formula (II)

(I)

(II)

from 0 to 30 ppm of water;
   optionally an additive; and
   a lithium salt,
   wherein the aprotic organic solvent or the aprotic organic solvent mixture is liquid at room temperature;
   $R^1$ is independently a $C_1$-$C_{10}$-alkyl;
   $R^2$ is independently a $C_1$-$C_{10}$-alkyl;

R³ is hydrogen or >C(R³)₂ is a >C=O group;
R⁴ is hydrogen;
X is independently selected from the group consisting of oxygen, sulfur, N—R⁵, and C(R⁶)₂;
R⁵ is selected from the group consisting of C₁-C₁₀-alkyl, C₃-C₁₀-cycloalkyl, benzyl, and C₆-C₁₄-aryl, optionally substituted by C₁-C₄-alkyl, benzyl, or phenyl;
R⁶ is independently selected from the group consisting of hydrogen, C₁-C₁₀-alkyl, C₃-C₁₀-cycloalkyl, benzyl, and C₆-C₁₄-aryl, optionally substituted by C₁-C₄-alkyl, benzyl, or phenyl; and
n is an integer from 1 to 3.

2. The mixture according to claim 1,
wherein the aprotic organic solvent is selected from the group consisting of cyclic organic carbonate or noncyclic organic carbonate,
di-C₁-C₁₀-alkyl ester,
di-C₁-C₄-alkyl-C₂-C₆-alkylene ester,
cyclic ester,
cyclic acetal, acyclic acetal, cyclic ketal, or acyclic ketal
orthocarboxylic ester and
cyclic carboxylic ester or noncyclic carboxylic ester.

3. The mixture according to claim 1, wherein the compound of formula (I) or (II) is (Ia), (Ib), (IIa), or (IIb):

(Ia)

(Ib)

(IIa)

(IIb)

wherein R¹ is independently a C₁-C₄-alkyl;
R² is independently a C₁-C₄-alkyl; and
R₆ is selected from the group consisting of hydrogen and methyl.

4. The mixture according to claim 1,
wherein the additive is selected from the group consisting of sultone, cyclic exo-methylene carbonate, lithium bisoxalatoborate (LiBOB), and lithium (difluoroxalato) borate (LiDFOB).

5. The mixture according to claim 1,
wherein the compound of formula (I) or (II) is selected from the group consisting of (Ia.1), (Ib.1), (IIa.1), and (IIb.1):

(Ia.1)

(Ib.1)

(IIa.1)

(IIb.1)

6. The mixture according to claim 1,
wherein the lithium salt is selected from the group consisting of LiPF₆, LiBF₄, LiSbF₆, LiBOB, LDFOB, and LiPF₃(CF₂CF₃)₃ (LiFAP).

7. The mixture according to claim 1 comprising:
from 50 to 99.5 wt % of the aprotic organic solvent or of the aprotic organic solvent mixture;
from 0.01 to 4 wt % of the compound of formula (I) or (II);
from 0 to 30 ppm of the water;
from 0 to 10 wt % of the additive; and
more than zero to 20 wt % of the lithium salt,
based on a total amount of the mixture.

8. A lithium ion battery, comprising the mixture according to claim 1.

9. The lithium ion battery according to claim 8, comprising a cathodic active material having manganese from 50 to 80 wt %, based on a content of transition metal.

10. The lithium ion battery according to claim 8, comprising an anode comprising an electrically conductive carbon.

11. A process for producing the mixture according to claim 1, comprising:
providing the aprotic organic solvent;
optionally mixing with an additional aprotic organic solvent;

optionally mixing with the additive; drying;
mixing with the compound of formula (I) or (II) with the lithium salt, and optionally with the additive.

12. The process according to claim 11, wherein the drying is effected with a molecular sieve.

* * * * *